(12) United States Patent
Min et al.

(10) Patent No.: US 9,183,503 B2
(45) Date of Patent: Nov. 10, 2015

(54) SPARSE HIGHER-ORDER MARKOV RANDOM FIELD

(71) Applicant: NEC Laboratories America, Inc., Princeton, NJ (US)

(72) Inventors: Renqiang Min, Plainsboro, NJ (US); Yanjun Qi, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 346 days.

(21) Appl. No.: 13/908,715

(22) Filed: Jun. 3, 2013

(65) Prior Publication Data

US 2013/0325786 A1 Dec. 5, 2013

Related U.S. Application Data

(60) Provisional application No. 61/654,255, filed on Jun. 1, 2012.

(51) Int. Cl.
*G06N 5/02* (2006.01)

(52) U.S. Cl.
CPC .................................. *G06N 5/025* (2013.01)

(58) Field of Classification Search
CPC ........... G06N 5/025; G06N 5/02; G06N 3/08; G06N 99/005
USPC .......................................................... 706/47
See application file for complete search history.

(56) References Cited

U.S. PATENT DOCUMENTS

2006/0051838 A1* 3/2006 Hwa et al. ..................... 435/69.1
2011/0054853 A1* 3/2011 Asadi et al. ....................... 703/2

OTHER PUBLICATIONS

Qian X. et al., "Sparse Higher Order Conditional Random Fields for improved sequence labeling", Proceedings of the 26th International Conference on Machine Learning, Montreal, Canada, 2009.*

Dahinden C. et al., "Penalized likelihood for sparse contingency tables with an application to full-length cDNA libraries", BMC Bioinformatics, 2007.*

Dahinden C., "High-Dimensional Log-Linear Model Selection with Applications in Molecular Biology", Disseration ETH Zurich, 2009.*

Mo Q., "A fully Bayesian hidden Ising model for ChIP-seq data analysis", Biostatistics, 2011, pp. 1-16.*

(Continued)

*Primary Examiner* — Jeffrey A Gaffin
*Assistant Examiner* — Dave Misir
(74) *Attorney, Agent, or Firm* — Joseph Kolodka

(57) ABSTRACT

Systems and methods are provided for identifying combinatorial feature interactions, including capturing statistical dependencies between categorical variables, with the statistical dependencies being stored in a computer readable storage medium. A model is selected based on the statistical dependencies using a neighborhood estimation strategy, with the neighborhood estimation strategy including generating sets of arbitrarily high-order feature interactions using at least one rule forest and optimizing one or more likelihood functions. A damped mean-field approach is applied to the model to obtain parameters of a Markov random field (MRF); a sparse high-order semi-restricted MRF is produced by adding a hidden layer to the MRF; indirect long-range dependencies between feature groups are modeled using the sparse high-order semi-restricted MRF; and a combinatorial dependency structure between variables is output.

16 Claims, 4 Drawing Sheets

(56) References Cited

OTHER PUBLICATIONS

Min M. et al., "Interpretable Sparse High-Order Boltzmann Machines", Proceedings of the 17th International Conference on Articial Intelligence and Statistics (AISTATS), 2014, Reykjavik, Iceland.*

Min M. et al., "Interpretable Sparse High-Order Boltzmann Machines for Transcription Factor Interaction Identication", NIPS Workshop on Machine Learning in Computational Biology, 2013.*

Min M. et al., "Ensemble Learning Based Sparse High-Order Boltzmann Machine for Unsupervised Feature Interaction Identification", , NIPS Workshop on Machine Learning in Computational Biology, 2014.*

Rangarajan A. et al., "Markov Random Fields and Neural Networks with Applications to Early Vision Problems", Artificial Neural Networks and Statistical Pattern Recognition: Old and New Connections, I. Sethi and A. Jain, editors, pp. 155-174, Elsevier Science Press, 1991.*

Buchman, et al., On Sparse, Spectral and Other Parameterizations of Binary Probabilistic Models, AISTATS, Jul. 2012, 9 Pages.

Dahinden, et al., Penalized Likeihood for Sparse Contingency Tables With an Application to Full Length cDNA Libraries, BMC Bioinformatics, Dec. 2007, vol. 8, pp. 1-11.

J.H. Friedman, et al., Predictive Learning Via Rule Ensembles, The Annals of Applied Statistics, Nov. 2008, pp. 916-954.

N. Friedman, Inferring Cellular Networks Using Probabalistic Graphical Models, Science, Feb. 2004, vol. 303 pp. 799-805.

N. Friedman, et al., Using Bayesian Networks to Analyze Expression Data, Journal of Computational Biology, 2000, vol. 7(3-4), pp. 601-620.

Heckerman et al., Dependency Networks for Collaborative Filtering and Data Visualization, UIAIP Proceedings 2000, Redmond, Washington, vol. 1, pp. 264-273.

Schmidt et al., Convex Structure Learning in Log-Linear Models: Beyond Pairwise Potentials, In Proceedings of the International Conference of Artificial Intelligence and Statistics, May 2010, pp. 1-140.

Schmidt et al., Structure Learning in Random Fields for Heart Motion Abnormality Detection, CVPR IEEC Computer Society, 2008, 8 Pages.

Segal et al., Module Networks: Identifying Regulatory Modules and Their Condition-Specific Regulators From Gene Expression Data, Nature Genetics, Jun. 2003, vol. 34 No. 2: pp. 166-176.

Wainwright et al., High Dimensional Graphical Model Selection Using I~1- Regularized Logistic Regression, Neural Information Processing Systems, 2006, Vancouver, BC, Canada, vol. 19:1465.

Whitington et al., Inferring Transcription Factor Complexes From ChIP-Seq Data, Nucleic Acids Research, May 20, 2011, pp. 2-11, vol. 39, No. 15:e98, Australia.

* cited by examiner

SPARSE HIGHER-ORDER MARKOV RANDOM FIELD

RELATED APPLICATION INFORMATION

This application claims priority to provisional application Ser. No. 61/654,255 filed on Jun. 1, 2012, the entirety of which is herein incorporated by reference.

BACKGROUND

1. Technical Field

The present invention relates to interactions between transcription factor binding, and more particularly, to a sparse high-order Boltzmann Machine for identifying combinatorial interactions between transcription factors.

2. Description of the Related Art

Identifying combinatorial relationships between transcription factors (TFs) maps the data mining task of discovering the statistical dependency between categorical variables. Model selection in high dimensional discrete case has been a traditionally challenging task. Recently, an approach of generative structure learning is to impose an L1 penalty on the parameters of the model, and to find a Maximum a posteriori probability (MAP) parameter estimate. The L1 penalty causes many of the parameters, corresponding to edge features, to go to zero, resulting in a sparse graph.

This was originally explored for modeling continuous data with Gaussian Markov Random Fields (MRFs) in two variants. In the Markov Blanket (MB) variant, the method learns a dependency network $p(y_i|y_{-i})$ by fitting d separate regression problems (independently regressing the label of each of the d nodes on all other nodes), and L1-regularization is used to select a sparse neighbor set. Although one can show this is a consistent estimator of topology, the resulting model is not a joint density estimator $p(y)$. In the Random Field (RF) variant, L1-regularization is applied to the elements of the precision matrix to yield sparsity. While the RF variant is more computationally expensive, it yields both a structure and a parameterized model (while the MB variant yields only a structure).

The discrete case is much harder than the Gaussian case, partially because of the potentially intractable normalizing constant. Another complicating factor in the discrete case is that each edge may have multiple parameters. This arises in multistate models as well as conditional random Fields. For modeling discrete data, algorithms have been proposed for the specific case where the data is binary and the edges have Ising potentials, and in the binary-Ising case, there is a 1:1 correspondence between parameters and edges, and this L1 approach is suitable. However, in more general scenarios (including any combination of multi-class MRFs, non-Ising edge potentials), where many features are associated with each edge, there exists a need for block-L1 systems and methods that jointly reduce groups of parameters to zero at the same time to achieve sparsity. Moreover, prior approaches do not reveal higher-order dependencies between variables, such as how the binding activity of one TF can affect the relationship between two other TFs.

SUMMARY

A method for identifying combinatorial feature interactions, comprising: capturing statistical dependencies between categorical variables, with the statistical dependencies being stored in a computer readable storage medium; selecting a model based on the statistical dependencies using a neighborhood estimation strategy, the neighborhood estimation strategy further comprising: generating sets of arbitrarily high-order feature interactions using at least one rule forest; and optimizing one or more likelihood functions; applying a damped mean-field approach to the model to obtain parameters of a Markov random field (MRF); producing a sparse high-order semi-restricted MRF by adding a hidden layer to the MRF; modeling indirect long-range dependencies between feature groups using the sparse high-order semi-restricted MRF; and outputting a combinatorial dependency structure between variables A system for identifying combinatorial feature interactions, comprising: a statistical dependency module configured to capture statistical dependencies between categorical variables, with the statistical dependencies being stored in a computer readable storage medium; a selector configured to select a model based on the statistical dependencies using a neighborhood estimation strategy, the neighborhood estimation strategy further comprising: a generator configured to generate sets of arbitrarily high-order feature interactions using at least one rule forest; and an optimizer configured to optimize likelihood functions; an application module configured to apply a damped mean-field approach to the model to obtain parameters of a Markov random field (MRF); a production module configured to produce a sparse high-order semi-restricted MRF by adding a hidden layer to the MRF; a modeler configured to model indirect long-range dependencies between feature groups using the sparse high-order semi-restricted MRF; and an output module configured to output a combinatorial dependency structure between variables.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
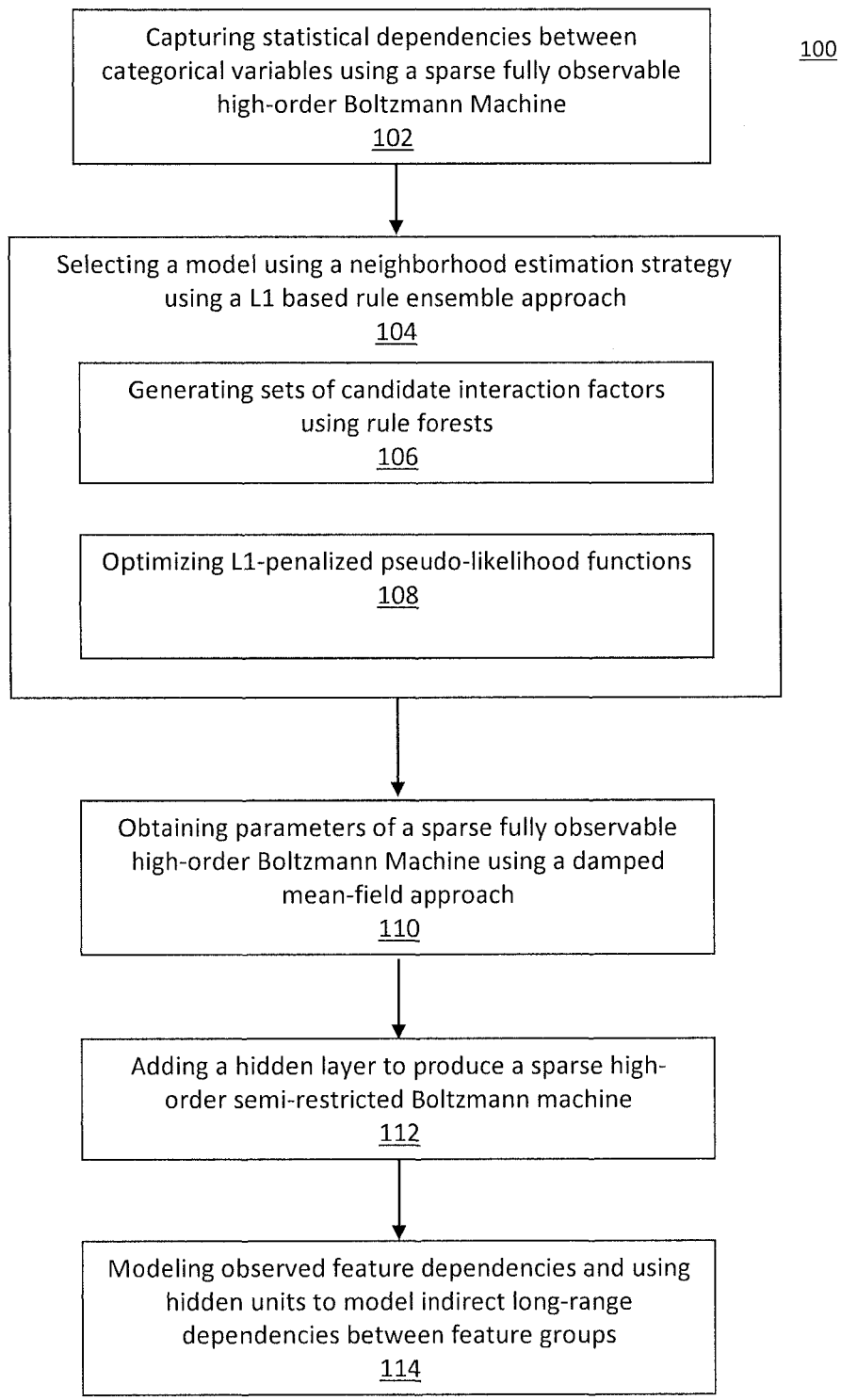
FIG. 1 is a diagram illustratively depicting a method for identifying combinatorial interactions between TF's using a sparse high-order Boltzmann Machine in accordance with an embodiment of the present principles.

In accordance with the present principles, systems and methods are provided for a sparse high-order Boltzmann Machine for identifying combinatorial interactions between transcription factors (TFs) which enable a general and flexible toolbox for regularization analysis in relatively high dimensional, discrete multivariate distribution in TF interactions. Studying how the components of complex systems work together in influencing biological outcomes is a central goal in systems biology. A TF is a protein controlling the flow (or transcription) of genetic information from deoxyribonucleic acid (DNA) to messenger ribonucleic acid (mRNA). Transcription factors perform their main function (i.e., regulation) by promoting (as an activator), or blocking (as a repressor) the recruitment of ribonucleic acid (RNA) polymerase, which is an enzyme that performs the transcription of genetic information from DNA to RNA, to specific genes. In other words, TFs may read and interpret the genetic "blueprint" of the DNA. They may bind to the DNA and help initiate a program of increased or decreased gene transcription. As such, they are vital for many important cellular processes.

TFs may be multi-functional and may regulate genes in a combinatorial fashion. Many TFs physically interact with specific partner TFs when binding to genomic DNA. These combinatorial interactions are critical to understanding TFs, as they may provide a means by which the cell can integrate diverse signals, as well as increasing the sensitivity of transcriptional rates to TF concentration. The interactions between TF bindings may have multiple forms (e.g., direct protein-protein interactions between TFs to form a TF complex (e.g., FOS/JUN, MYC/MAX), or may occur via intermediate bridging proteins, resulting in a DNA binding complex of multiple TFs (e.g., GATA-1/SCL/E47/Ldb1). Physical interaction between TFs comprises one important aspect of TF binding, mediating tissue-specific gene expression. Studying and identifying combinatorial interactions involving transcription factor (TF) bindings is a critical task in computational biology. Most relevant genome-wide TF studies focus on the pairwise co-association analysis (i.e., independent analysis of pairs of TFs) which does not reveal higher-order dependencies, such as how the binding activity of one TF can affect the relationship between two other TFs.

In one embodiment according to the present principles, using TF Chromatin immunoprecipitation sequence (ChIP0-seq) data sets, a method for identifying how TFs interact based on statistical dependencies of their binding events in ChIP-Seq expression measurements. This method advantageously identifies biologically significant TF binding complexes. ChIP followed by high-throughput chip sequencing (e.g., ChIP-seq) is a powerful and high-resolution method for finding a targeted genes' DNA location (loci) of individual TF proteins, on the genome-wide scale in higher eukaryotes.

In one embodiment, computational analysis is performed to extract biologically relevant information from a TF's ChIP-seq data. The present principles may be employed to discover high-order interactions between TFs by a high-order Boltzmann Machine (hBM) for representing statistical dependencies between CHiP-seq signals. A fully-observed hBM may be employed to model joint multivariate probability distributions that capture properties of conditional independence between variables. Such a model may describe complex stochastic processes, and provide clear methodologies for learning from (noisy) observations.

In one embodiment, random forest learning may be employed to generate a plurality of decision trees from random samplings of data sets, and the random forest learning may enable complicated feature interactions to be scalable to large scale problems. Random forest learning may capture arbitrary high-order interactions, and max likelihood learning may be employed to fine tune the weight associated with high-order interactions in a high order Markov random field (e.g., Boltzmann machine). In one embodiment, paths of the plurality of decision trees may be employed to define rules. L1-regularized regression may be employed to filter the most informative and/or most important interactions (i.e., rules) or terms (i.e., potential functions). The method according to the present principles may also be applied to data involving transcription factor interactions to predict disease. It is noted that although transcription factors are illustratively shown according to the present principles, it is contemplated that the present principles are applicable to any data sets for learning feature interactions (e.g., arbitrary high-order feature interactions). In one embodiment, future interactions of data may be gleaned, and word interactions for document ranking may be learned.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a method for identifying combinatorial interactions between TF's using a sparse high-order Boltzmann Machine for 100 is illustratively depicted according to one embodiment of the present principles. In one embodiment, statistical dependencies are captured between variables (e.g., categorical variables) using a sparse fully observable high-order Boltzmann Machine (BM) in block 102. A fully observable high-order BM may be designed to have sparse higher-order lateral connections between softmax fisible units (i.e., features) to model feature dependencies.

In one embodiment, a fully-observed Boltzmann Machine may be an undirected graphical model with just one visible layer of visible units v and no hidden units. For a fully observed Boltzmann Machine (BM) with stochastic binary visible units v, the joint probability distribution of a configuration (v of BM) may be defined based on its energy as follows:

$$-E(v) = \sum_{i<j} W_{ij}v_iv_j + \sum_i b_iv_i$$

$$p(v) = \frac{1}{Z}\exp(-E(v)),$$

where b are biases, -E(v) is an energy function, p(v) is a likelihood function, v is a parameter, v is a normalization factor and includes all v, W is weights (i.e., parameters) to learn, b is a bias parameter, and Z is a partition function with $Z = \sum_u \exp(-E(u))$ It is noted that variables defined herein have the same meaning throughout unless otherwise indicated.

In one embodiment, a model may be selected in block 104 using a neighborhood estimation strategy under a L1-based rule ensemble approach according to the present principles. In one embodiment, stochastic dynamics and the learning rule may accommodate more complicated energy functions. For example, the quadratic energy function in $$-E(v) = \sum_{i<j} W_{ij}v_iv_j + \sum_i b_iv_i$$

may be replaced by an energy function whose a typical third-order term like $v_iv_jv_kw_{ijk}$. The change in the learning rule may be that $v_iv_j$ may be replaced by $v_iv_jv_k$.

In one embodiment, adding a hidden layer of random binary variables h onto a Boltzmann Machine produces a restricted Boltzmann Machine (RBM) with stochastic binary visible units v. There may be symmetric connections between a hidden layer and a visible layer, and there may be no within-layer connections. The joint probability distribution of a configuration may be defined based on its energy as follows:

$$E(v, h) = -\sum_{i \text{ is visible}} b_iv_i - \sum_{j \text{ is hidden}} b_jh_j - \sum_{i,j} v_ih_jw_{ij},$$

where E(v,h) is an energy function, v is visible, h is hidden, and $b_i$, $v_i$, $h_i$, and $w_i$ are parameters in an RBM.

In one embodiment, when each feature variable of discrete categorical data has an arbitrary order of possible values (assuming totally K possible values), the model Using K softmax binary units to represent each discrete feature with K possible values. Thus the energy function of c-order hBM for discrete data may be represented as $$-E(v) = \sum_{r_1}\sum_{r_2}\cdots\sum_{r_c}\sum_{k_1}\sum_{k_2}\cdots\sum_{k_c} W_{r_1r_2\ldots r_c}^{k_1k_2\ldots k_c} v_{r_1}^{k_1}v_{r_2}^{k_2}\cdots v_{r_c}^{k_c},$$

where K softmax binary visible units may be employed to represent each discrete feature variable taking å values from 1 to K. The notation $v_i^k = 1$ means the discrete value of the i-th feature is k. $W_{ii'}^{kk'}$ describes the connection weight between observed variable i taking value k and feature i' taking value k'). In one embodiment, if there exist n discrete features and K possible discrete values for each feature, there may be $$\frac{n(n-1)K^2}{2}$$

lateral (pairwise) connection weights.

In one embodiment, given a training set of state vectors (i.e., the data), learning may consist of finding weights and biases (i.e., the parameters) that make those state vectors good. More specifically, weights and biases may be found that define a Boltzmann distribution in which the training vectors have high probability, which means to optimize $$p(v) = \frac{1}{Z}\exp(-E(v)).$$

In one embodiment, in practice for c-th order hBM, it is not always necessary to include a potential for all $c^K$ subsets. Model selection for hBM could be performed by solving the following optimization problem by using the sparsity regularization on weight parameter W, $$\min_W \frac{1}{Z}\exp(-E(v)) + \lambda \cdot \|W\|$$

Also, calculating the log-likelihood p(v) and its gradient are intractable (due to the logarithm of the normalizing constant and its gradient). The pseudo-likelihood could be used to optimize the (regularized) product of the conditional distributions, $$\min_W \sum_{i=1}^n \sum_{j=1}^p \log p(v_j^{(i)} \mid V_{-j}^{(i)}, W) + \lambda \cdot \|W\|$$

In one embodiment, the above L1-penalized pseudo-likelihood functions may be optimized through two steps, (1) the whole structure learning and (2) parameter learning/fitting.

For example, in one embodiment, the conditional distribution of $v_i$ given the other variables $V_{-j} = \{v_1, v_2, \ldots, v_{(j-1)}, v_{(j+1)}, \ldots, v_p\}$ may take the form of $$p(v_j = k \mid V_{-j} = \{1, \ldots, K\}^{(c-1)}, W) =$$

$$\frac{\exp\left(\sum_{r_2}\cdots\sum_{r_c}\sum_{k_2}\cdots\sum_{k_c}\beta_{j,r_2\ldots r_c}^{k,k_2\ldots k_c} v_j v_{r_2}^{k_2}\cdots v_{r_c}^{k_c}\right)}{\sum_{l=1}^K \exp\left(\sum_{r_2}\cdots\sum_{r_c}\sum_{k_2}\cdots\sum_{k_c}\beta_{j,r_2\ldots r_c}^{l,k_2\ldots k_c} v_j^l v_{r_2}^{k_2}\cdots v_{r_c}^{k_c}\right)}$$

In one embodiment, $v_j$ may be viewed as the response variable y in a logistic regression (e.g., multinomial) where the indicator functions associated with the other variables may play the role of the covariates x. This "neighborhood estimation" strategy handles per-node optimization taking the form of $$\min_\beta \sum_{i=1}^n L(y^{(i)}, \beta^T x^{(i)}) + \lambda |\beta|_1.$$

Here, x may be a vector including all (c-1)-th order interaction factors from $V_{-j}$ and L may represent the logistic loss function, T is a number of iterations, and β is a set of parameters.

In one embodiment, the per-node optimization may employ rule forests to obtain a rich set of candidate interaction factors in block 106. Rules may be conjunctions of basic propositions concerning the values taken by the input features. From the perspectives of interpretability as well as generalization, it is highly desirable to construct rule ensembles with low training error, and having rules that may be simple (i.e., involve few conjunctions), and may be few in number. In one embodiment, the (exponentially) large feature space of all possible conjunctions may be represented optimally and efficiently as general regression and classification models, and may be constructed as linear combinations of simple rules derived from the data. Each rule may consist of a conjunction of a small number of simple statements concerning the values of individual input variables.

In one embodiment, rule ensembles may produce a higher predictive accuracy comparable to conventional methods. However, their principal advantage may lie in interpretation. Because of its simple form, each rule is easy to understand, and its influence on individual predictions, selected subsets of predictions, or globally over the entire space of joint input variable values is also simple to understand. Similarly, the degree of relevance of the respective input variables may be assessed globally, locally in different regions of the input space, or at individual prediction points. In one embodiment, those variables that are involved in interactions with other variables, the strength and degree of those interactions, as well as the identities of the other variables with which they interact may be automatically identified according to the present principles. Graphical representations may be employed to visualize both main and interaction effects.

In one embodiment, the combinatorial optimization of the per-node optimization is achieved by performing a factor filter step by growing an ensemble of decision trees through multiple randomly generated subsample using a perturbation sampling technique. Each node (e.g., interior, terminal) of each tree may produce a collection of factors which may be used in subsequent steps of the present method. In one embodiment, an ensemble of decision trees may be viewed as a filter which defines a collection of high-order factors and may exploit existing fast algorithms for producing decision tree ensembles. The factor corresponding to any node in a tree may be given by the product of the items associated with all of the edges on a path from a root to a particular node.

In embodiment, to optimize the regularized pseudo-likelihood, multiple (i.e., multinomial) logistic regression problems may not be independent (e.g., multiple parameters may be shared across multiple problems). Each problem may be handled separately, and as such, the method may function as structured learning, and parameter estimation may be achieved using damped mean-field updates to re-estimate the parameters W by employing the below method:

$$p(v_j = k \mid V_{-j} = \{1, \ldots, K\}^{(c-1)}, W) =$$

$$\frac{\exp\left(\sum_{r_2} \cdots \sum_{r_c} \sum_{k_2} \cdots \sum_{k_c} W_{j, r_2 \ldots r_c}^{k, k_2 \ldots k_c} v_{r_2}^{k_2} \ldots v_{r_c}^{k_c}\right)}{\sum_{l=1}^{K} \exp\left(\sum_{r_2} \cdots \sum_{r_c} \sum_{k_2} \cdots \sum_{k_c} W_{j, r_2 \ldots r_c}^{l, k_2 \ldots k_c} v_{r_2}^{k_2} \ldots v_{r_c}^{k_c}\right)}$$

$$r^0(v_j^k) = \operatorname{softmax}\left((W_{-j}^k)^T V_{-j}, k\right)$$

$$r^t(v_j^k) =$$

$$\lambda r^{t-1}(v_j^k) + (1-\lambda) \times \operatorname{softmax}\left((W_{-j}^k)^T V_{-j} + \sum_{j'k'; j' \neq j} L_{jj'kk'} r^{t-1}(v_{j'}^{k'}), k\right)$$

$$t = 1, \ldots, T, \ 0 < \lambda < 1,$$

where $$\operatorname{softmax}(z_k, k) = \frac{\exp(z_k)}{\sum_{k=1}^{K} \exp(z_k)},$$

T is the maximum number of iterations of mean-field updates, and a data vector v may be employed for initialization.

In one embodiment, L1-penalized pseudo-likelihood functions may be optimized in block 108, and may execute the whole structure and parameter learning in two consecutive steps. In another embodiment, the method may include adding a hidden layer to obtain a sparse high-order semi-Restricted Boltzmann Machine (SRBM) in block 112. The SRBM may include sparse strong higher-order lateral connections between softmax visible units (i.e., features), and may model observed feature dependencies and employ hidden units to model indirect long-range dependencies between feature groups in block 114. It should be noted that although the above configurations are illustratively depicted according to the present principles, it is contemplated that other sorts of configurations may also be employed according to the present principles.

Figure 2:
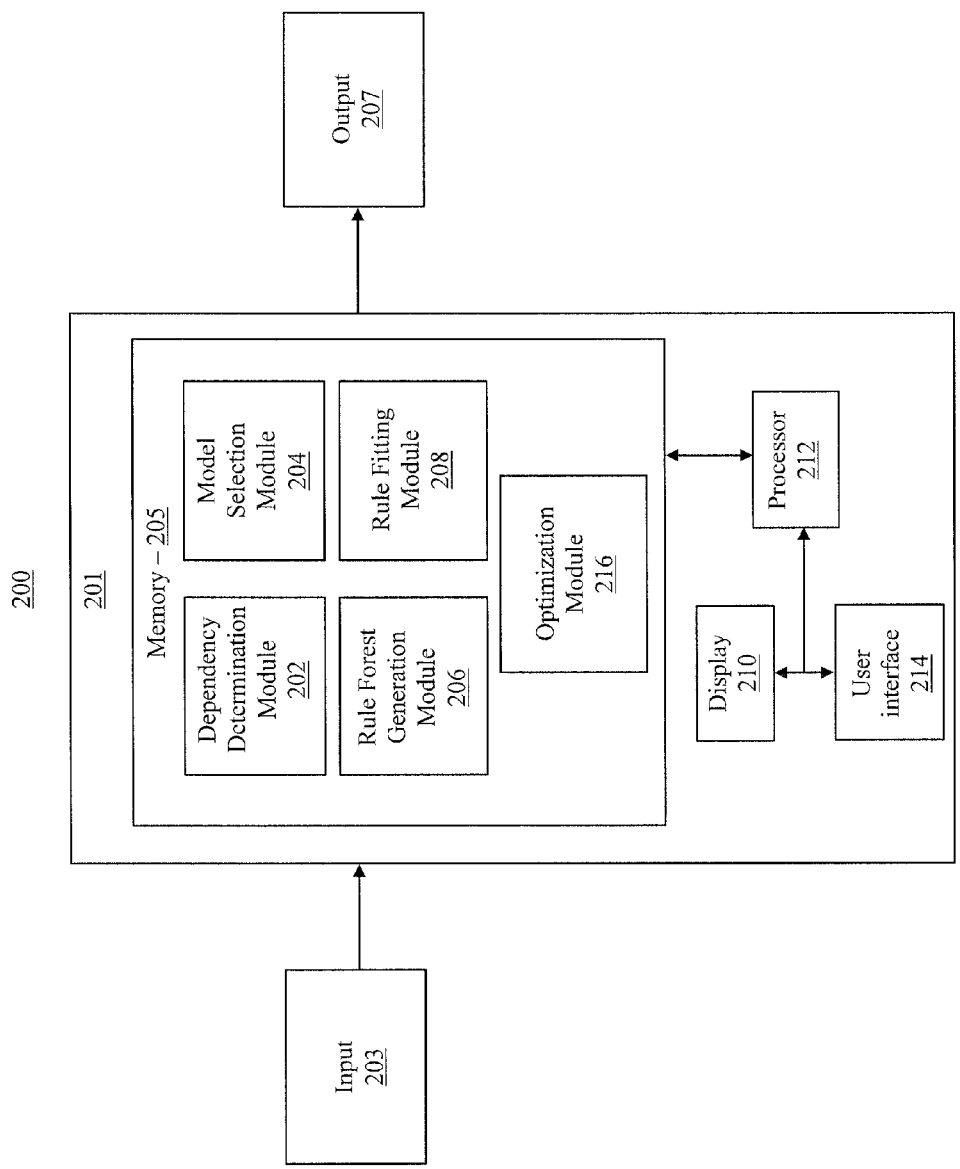
FIG. 2 is a block/flow diagram illustratively depicting a system for identifying combinatorial interactions between TF's using a sparse high-order Boltzmann Machine in accordance with an embodiment of the present principles.

Referring now to FIG. 2, a system for identifying combinatorial interactions between TF's using a sparse high-order Boltzmann Machine 200 is illustratively depicted according to one embodiment of the present principles. The system 201 preferably includes one or more processors 212 and memory 205 for storing applications, modules and other data. System 201 may include one or more displays 210 for viewing. The displays 210 may permit a user to interact with the system 201 and its components and functions. This may be further facilitated by a user interface 214, which may include a mouse, joystick, or any other peripheral or control to permit user interaction with the system 201 and/or its devices. It should be understood that the components and functions of the system 201 may be integrated into one or more systems or workstations.

System 201 may receive input data 203, which may be employed as input to a plurality of modules, including a dependency determination module 202, a model selection module, a rule forest generation module, a rule fitting module, and an optimization module. System 201 may produce output data 204, which in one embodiment may be displayed on a display device 210. It should be noted that while the above configuration is illustratively depicted, it is contemplated that other sorts of configurations may also be employed according to the present principles.

Figure 3:
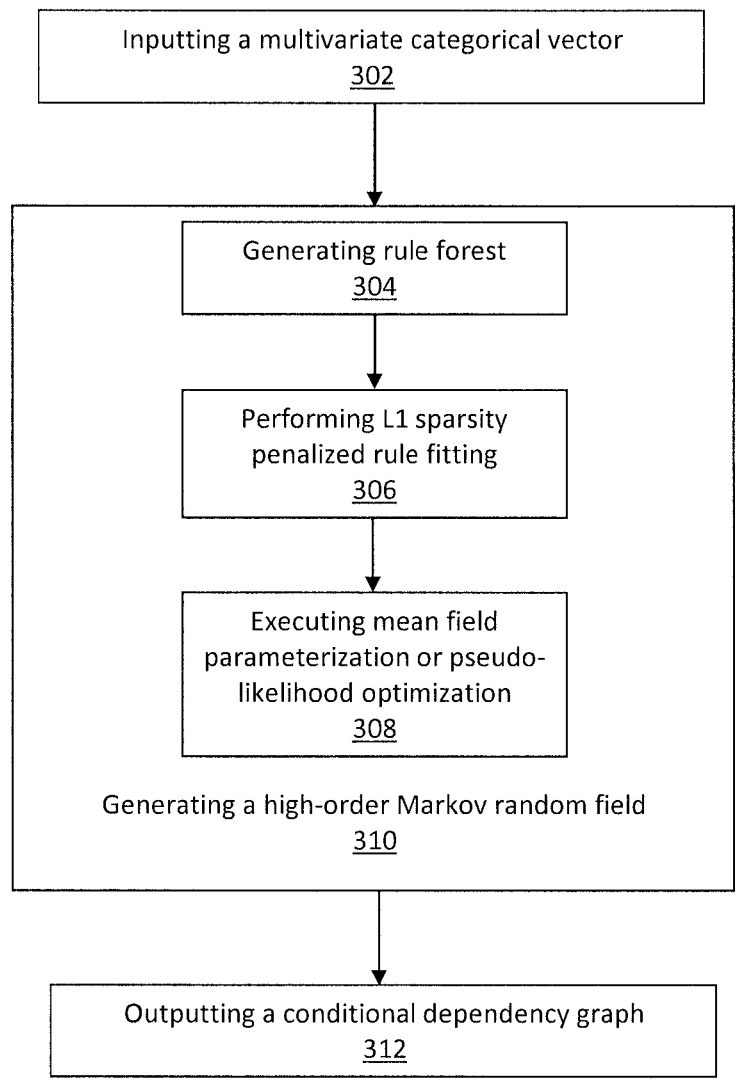
FIG. 3 is a block/flow diagram illustratively depicting a system/method for generating a conditional dependency graph using a sparse high-order Markov Random Field (MRF) in accordance with an embodiment of the present principles.

Referring now to FIG. 3, a block/flow diagram illustratively depicting a system/method for generating a conditional dependency graph using a sparse high-order Markov Random Field (MRF) 300 is shown in accordance with an embodiment of the present principles. In one embodiment, a multivariate categorical vector (e.g., ChIP-seq signals for TF, protein expression signal of microarray) may be input in block 302. A sparse high-order MRF may be generated in block 310 by generating a rule forest in block 304, performing L1 sparsity penalized rule fitting in block 306, and executing mean field parameterization or pseudo-likelihood optimization in block 308. A conditional dependency graph may be output in block 312. It should be noted that while the above configuration is illustratively depicted, it is contemplated that other sorts of configurations may also be employed according to the present principles.

Figure 4:
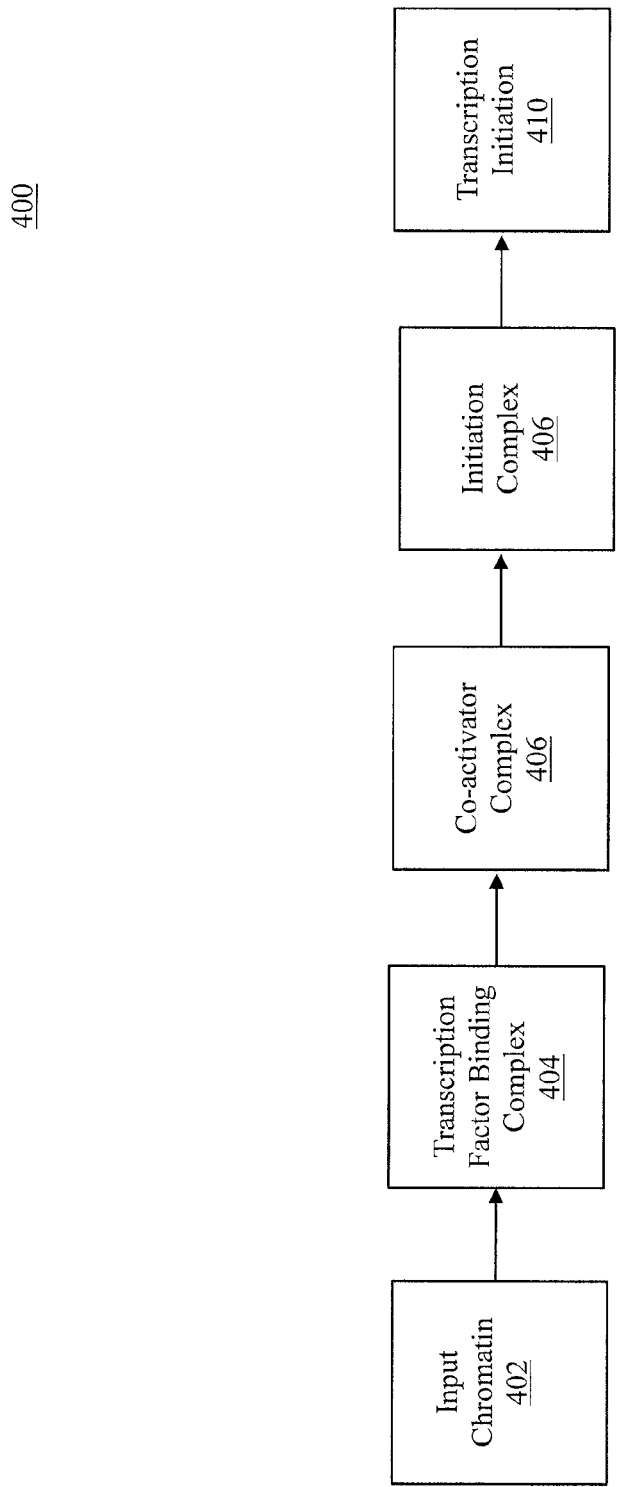
FIG. 4 is a diagram illustratively depicting a high-level schematic of a Transcription Factor binding complex in accordance with an embodiment of the present principles.

Referring now to FIG. 4, a diagram illustratively depicting a high-level schematic of a Transcription Factor binding complex (TFBC) 400 is shown in accordance with an embodiment of the present principles. In one embodiment, Chromatin may be input into the system in block 402. A TFBC is illustratively shown in block 404 which may identify complex interactions between TFs. A coactivator complex may bridge an activator and other components necessary for transcription in block 406. An initiation complex 410 begins the initiation process, and transcription initiation may be achieved in block 412, and is related to interaction between TFs. While the above configuration is illustratively depicted according to the present principles, it is contemplated that other sorts of configurations may also be employed in accordance with the present principles.

It should be recognized that the present principles are not limited to the particular embodiments described above. Rather, numerous other embodiments of the sparse high-order Boltzmann Machine for identifying combinatorial interactions between TFs may also be employed in accordance with the present principles.

Having described preferred embodiments of a system and method for sparse high-order Boltzmann Machine for identifying combinatorial interactions between TFs (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for identifying combinatorial feature interactions, comprising:
   capturing statistical dependencies between categorical variables, with the statistical dependencies being stored in a computer readable storage medium;
   selecting a model based on the statistical dependencies using a neighborhood estimation strategy, the neighborhood estimation strategy further comprising:
      generating sets of arbitrarily high-order feature interactions using at least one rule forest; and
      optimizing one or more likelihood functions;
   applying a damped mean-field approach to the model to obtain parameters of a Markov random field (MRF), wherein the MRF is a Boltzmann machine;
   producing a sparse high-order semi-restricted MRF by adding a hidden layer to the MRF;
   modeling indirect long-range dependencies between feature groups using the sparse high-order semi-restricted MRF; and
   outputting a combinatorial dependency structure between variables, wherein the combinatorial feature interactions are identified between transcription factors (TF).

2. The method as recited in claim 1, wherein the selecting a model using a neighborhood estimation strategy includes employing an L1-based rule ensemble approach on any of a given transcription factor (TF).

3. The method as recited in claim 1, wherein L1-sparsity penalized rule fitting is employed during the generating sets of arbitrarily high-order feature interactions to achieve optimal parameterization.

4. The method as recited in claim 1, wherein the combinatorial dependency structure includes combinatorial interactions involving TF bindings in cellular systems.

5. The method as recited in claim 1, wherein the modeling includes modeling observed feature dependencies.

6. The method as recited in claim 1, wherein a weight associated with the arbitrarily high-order feature interactions in a final sparse high-order MRF is fine-tuned using maximum likelihood learning.

7. The method as recited in claim 1, wherein hidden units are employed during modeling to model the indirect long-range dependencies between feature groups.

8. The method as recited in claim 1, wherein the one or more likelihood functions are L1-penalized pseudo-likelihood functions.

9. A system for identifying combinatorial feature interactions, comprising:
   a statistical dependency module configured to capture statistical dependencies between categorical variables, with the statistical dependencies being stored in a non-transitory computer readable storage medium;
   a selector configured to select a model based on the statistical dependencies using a neighborhood estimation strategy, the neighborhood estimation strategy further comprising:
      a generator configured to generate sets of arbitrarily high-order feature interactions using at least one rule forest; and
      an optimizer configured to optimize likelihood functions;
   an application module configured to apply a damped mean-field approach to the model to obtain parameters of a Markov random field (MRF), wherein the MRF is a Boltzmann machine;
   a production module configured to produce a sparse high-order semi-restricted MRF by adding a hidden layer to the MRF;
   a modeler configured to model, using a hardware processor, indirect long-range dependencies between feature groups using the sparse high-order semi-restricted MRF; and
   an output module configured to output a combinatorial dependency structure between variables, wherein the combinatorial feature interactions are identified between transcription factors (TF).

10. The system as recited in claim 9, wherein the selecting a model using a neighborhood estimation strategy includes employing an L1-based rule ensemble approach on any of a given transcription factor (TF).

11. The system as recited in claim 9, wherein L1-sparsity penalized rule fitting is employed during the generating sets of arbitrarily high-order feature interactions to achieve optimal parameterization.

12. The system as recited in claim 9, wherein the combinatorial dependency structure includes combinatorial interactions involving TF bindings in cellular systems.

13. The system as recited in claim 9, wherein the modeler is configured to model observed feature dependencies.

14. The system as recited in claim 9, wherein a weight associated with the arbitrarily high-order feature interactions in a final sparse high-order MRF is fine-tuned using maximum likelihood learning.

15. The system as recited in claim 9, wherein hidden units are employed during modeling to model the indirect long-range dependencies between feature groups.

16. The system as recited in claim 9, wherein the one or more likelihood functions are L1-penalized pseudo-likelihood functions.

* * * * *